United States Patent
Tije

[11] Patent Number: 5,891,342
[45] Date of Patent: Apr. 6, 1999

[54] DEWATERING PROCESS

[75] Inventor: A. Ten Tije, Deldren, Netherlands

[73] Assignee: Scapa Group PLC, Blackburn, United Kingdom

[21] Appl. No.: 809,940
[22] PCT Filed: Sep. 22, 1995
[86] PCT No.: PCT/GB95/02255
§ 371 Date: Apr. 3, 1997
§ 102(e) Date: Apr. 3, 1997
[87] PCT Pub. No.: WO96/11051
PCT Pub. Date: Apr. 18, 1996

[30] Foreign Application Priority Data

Oct. 6, 1994 [GB] United Kingdom .................. 9420216

[51] Int. Cl.$^6$ .................................................. C02F 1/52
[52] U.S. Cl. ........................ 210/723; 210/710; 210/748; 210/783; 204/553
[58] Field of Search .......................... 204/553; 210/702, 210/710, 723, 734, 748, 783

[56] References Cited

U.S. PATENT DOCUMENTS

| | | |
|---|---|---|
| 4,160,711 | 7/1979 | Nishizawa et al. ..................... 204/553 |
| 4,244,804 | 1/1981 | Moeglich . |
| 4,249,653 | 2/1981 | Kufferath-Kassner . |
| 4,420,529 | 12/1983 | Westhead . |
| 4,501,648 | 2/1985 | Ritter ...................................... 210/748 |
| 4,796,749 | 1/1989 | Lefferts . |
| 4,839,213 | 6/1989 | Gauthier . |
| 4,861,496 | 8/1989 | Diaz ....................................... 204/553 |
| 5,049,248 | 9/1991 | Muralidhara . |
| 5,114,560 | 5/1992 | Senapati et al. ........................ 204/553 |
| 5,230,809 | 7/1993 | Roslonski ............................... 204/553 |

FOREIGN PATENT DOCUMENTS

| | | |
|---|---|---|
| 0 018 200 | 10/1980 | European Pat. Off. . |
| 0 124 040 | 11/1984 | European Pat. Off. . |
| 0 578 182 | 1/1994 | European Pat. Off. . |
| 6170123 | 6/1994 | Japan . |
| 1163511 | 9/1969 | United Kingdom . |
| 1456721 | 11/1976 | United Kingdom . |
| 2 083 431 | 3/1982 | United Kingdom . |
| WO80/02650 | 12/1980 | WIPO . |

OTHER PUBLICATIONS

WPI Abst. Accession Nos. 92–049394/06 & ZA 9100538.
WPI Abst. Acc. Nos. 84–085990/14 & JP 59036507 A (K. Kogyo).
WPI Acc. No. 85–226762/37 & JP 60147209 A (Fuji).
WPI Abst. Acc. No. 92–049394/06 & ZA 9100538 A (CSIR).
WPI Abst. Acc. No. 84–085990/14 & JP 59036507 (K. Kogyo).

*Primary Examiner*—Jay H. Woo
*Assistant Examiner*—Betsey J. Morrison
*Attorney, Agent, or Firm*—Jacobson, Price, Holman & Stern, PLLC

[57] ABSTRACT

A dewatering process in which a product comprising water and other materials is simultaneously subjected to compressive mechanical forces and electro-osmosis using a belt (12) having a plurality of connected spiral yarns and, at least in part, electrically conductive material thereon.

12 Claims, 3 Drawing Sheets

DEWATERING PROCESS

BACKGROUND OF THE INVENTION

1. Field of the Invention

The present invention relates to a dewatering process and more particularly to a belt for use in the dewatering process.

2. Related Art

In any industrialized country there currently exists the problem of the disposal of the vast and ever increasing amounts of sludge produced during the purification of drinking water and sewage and the dredging of waterways such as harbors, canals and drainage channels. Some sludge may be used as a fertilizer or landfill material, or may be incinerated, but the largest proportion of waste sludge must be dumped due to its contaminated nature, particularly where it has been recovered from areas of significant industrial activity. As the price for disposal of sludge rises so does the need to reduce the sludge weight and volume, in order to lower both dumping and transport costs.

Waste sludge typically has a very low solids content (less than 10 wt. %—the rest being water), so it makes sense to reduce the weight and volume by lowering the water content. Traditional gravitational techniques such as sedimentation or flotation are slow and can only achieve maximum solids content in the order of 12 wt. %. More recent methods include the use of chamber filter presses, wire belt presses and centrifugal techniques. The former requires a large amount of flocculating agent to be added, whilst the latter two are restricted by the relatively low dwell time of the sludge in the dewatering areas. All are particularly unsuitable for fine, highly colloidal sludges, where a significant proportion of the solid particles can not be retained without the use of a much finer filter medium, thereby lowering the permeability of the sludge bed and leading to maximum achievable solids content of about 15 wt. % for such sludge types.

The use of electro-osmosis as a dewatering technique is described in DE 124509. A material is dispersed in a polar solution having a charged surface. Therefore the electrolyte in the immediate vicinity of the charged surface possesses a net excess opposite charge due to the electro-static attraction forces of the ions of opposed polarity. In the region of the charged surface a so-called diffuse double layer is formed, whereby some of the ions are firmly bonded at said surface and are removed from the equilibrium arising from the tendency of particles in the highly. concentrated surface region of the liquid to diffuse into the less concentrated bulk interior. This results in a concentration gradient of ions which drops off rapidly away from the charged surface. In order for these firmly bonded ions to become mobile once again, a potential needs to be applied—the so-called zeta potential. By keeping the sludge matrix between the electrodes, the rate of dewatering at the cathode will be accelerated upon the application of an electric field corresponding to at least the value of the zeta potential, since the ions are then able to move freely to and from the disperse phase.

The effectiveness of mechanical dewatering techniques is dependent upon the permeability of the medium to be dewatered, since the applied force (pressure for wire belt or chamber filter presses, gravitational acceleration for decanter centrifuges) compacts the bed of material particles. Hence the porosity of the bed is reduced and therefore the flow of water from the bed is reduced. For electro-osmosis the liquid flow is independent of the bed porosity. Here it is the electrical conductivity of said disperse phase that is the key factor and therefore low bed porosities will not reduce the effectiveness of water removal. Dewatering times can be reduced with respect to mechanical techniques by applying a potential difference across the sludge bed. This reduction in time results in a net energy saving.

SUMMARY OF THE INVENTION

The object of the invention is to provide a still more efficient means of dewatering sludges so as to provide an increase of solids content in the end product.

According to a first aspect of the present invention there is provided a sludge dewatering process in which a sludge product comprising water and other materials is subjected to compressive mechanical forces and electro-osmosis using a belt comprising, at least in part, electrically conductive material, wherein the belt comprises a plurality of connected spiral yarns and wherein the said electrically conductive material is inserted into and/or onto the said spiral yarns.

The belt may wholly comprise electrically conductive material.

The mechanical and electro-osmosis techniques preferably take place simultaneously.

The combination of electro-osmosis and mechanical dewatering techniques leads to a faster, low energy consumption process whereby higher solids contents are achievable than with electro-osmotic or mechanical methods alone.

The process according to the invention is particularly useful for the dewatering of sludges and slurries produced by water purification plants, metal processing and galvanizing installations and factory farms.

In order to increase the particle size of fine colloidal sludges it is preferred that a conditioning (flocculating) agent is added to coagulate the fine particles by neutralizing the ionic charges and thereby eliminate electrostatic repulsion. These are typically high molecular weight, water-insoluble synthetic polymers containing charged groups. Particularly preferred are SUPERFLOC A-130 (Trade Mark), an anionic polyacrylamide having a molecular weight of 6,000,000–8,000,000 or SYNTHOFLOC 8022 H-PWG (Trade Mark). Cationic polyelectrolytes may also be used. Since the addition of flocculating agents will lead to an increase in the surface charge and therefore an increased zeta potential, the amount added must not be too great. Preferably substantially 4 kg of flocculating agent is used per metric ton sludge.

The potential difference applied is preferably no greater than 30 V and the electrical current is preferably no greater than 120 A.

According to a second aspect of the present invention there is provided the use of a filter belt in a sludge dewatering process in which a sludge product comprising water and other materials is subjected to compressive mechanical forces and electro-osmosis, the said belt comprising, at least in part, electrically conductive material, wherein the belt comprises a plurality of connected spiral yarns and the said electrically conductive material is inserted into and/or onto the said spiral yarns.

The filter belt used in the dewatering process preferably comprises polyester and/or polyamide spirals. Any conducting material may be inserted into and/or onto the base material of the belt. The conducting material preferably comprises at least one strip or braided yarn. Preferred materials include steel, copper or carbon which preferably extend through the belt. Electrically conductive staple fibre, especially tinned copper, may also be secured to one or both sides of the fabric, preferably by needling to ensure contact with the insert.

The base material may be a link belt of the type described in EP 0028630. The spiral fibers comprise a multiplicity of helical coils joined in side-by-side disposition by hinge wires of a thermo-plastic monofilament material threaded through the interdigitated turns of adjacent coils. The resultant link structure is subjected to a suitable heat setting temperature and longitudinal tension to cause the hinge wires to deform and assume a crimped configuration in the plane of the structure.

The hinge wires extend in the cross machine direction of the belt. Conductive material is located within each coil intermediate the interdigitating sections of that coil with adjacent coils. The conductive material preferably comprises conducting wires or strips extending in the cross machine direction. Conductive staple fibers may be needled to one or both sides of the belt.

BRIEF DESCRIPTION OF THE DRAWINGS

In order that the present invention may be more readily understood a specific embodiment thereof will now be described by way of example only with reference to the accompanying drawings in which.

DETAILED DESCRIPTION OF THE PREFERRED EMBODIMENT

Figure 1:
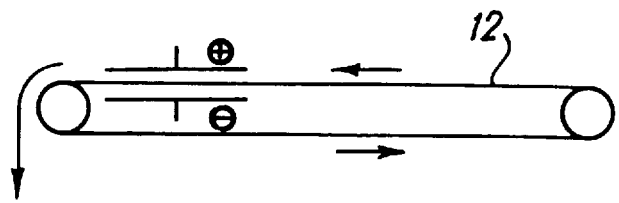
FIG. 1 is a schematic diagram of the process of the invention.
Figure 1:
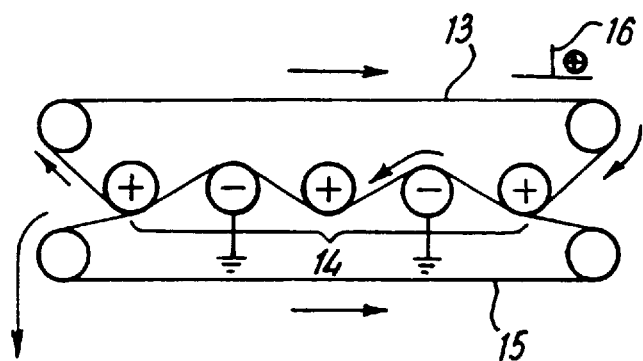

Referring to FIG. 1, sludge such as that produced by the addition of polyaluminium chlorides to drinking water in a purification plant, is pumped to a polymeric flocculation agent/sludge mixing vessel 11 for flocculation. The flocculated sludge is applied directly to a first pre-dewatering belt 12 whereupon a large proportion of the water drains away under gravity. The pre-dewatered sludge undergoes a second similar pre-dewatering on another belt 13 before entering the press zone 14. Herein the sludge is transported between two belts 13,15, at least one of which being porous, and an increasing excessive force is applied to the sludge bed. The dewatered sludge is finally removed from the belts using scrapers and the belts are rinsed in a cleaning installation. Stainless steel cathodes are incorporated at various points in the cycle. In the press section, however, no such electrodes are used. Instead the press belt comprises a polyester spiral fabric having all the synthetic polymer stuffer yarns located in the coils replaced with one or more metal strips or yarns. The metal strips or yarns, which are charged by way of a wiper 16, serve to act as a cathode, while the carbon steel press rollers act as alternate anodes and cathodes. These rollers may optionally be coated.

Figure 2:
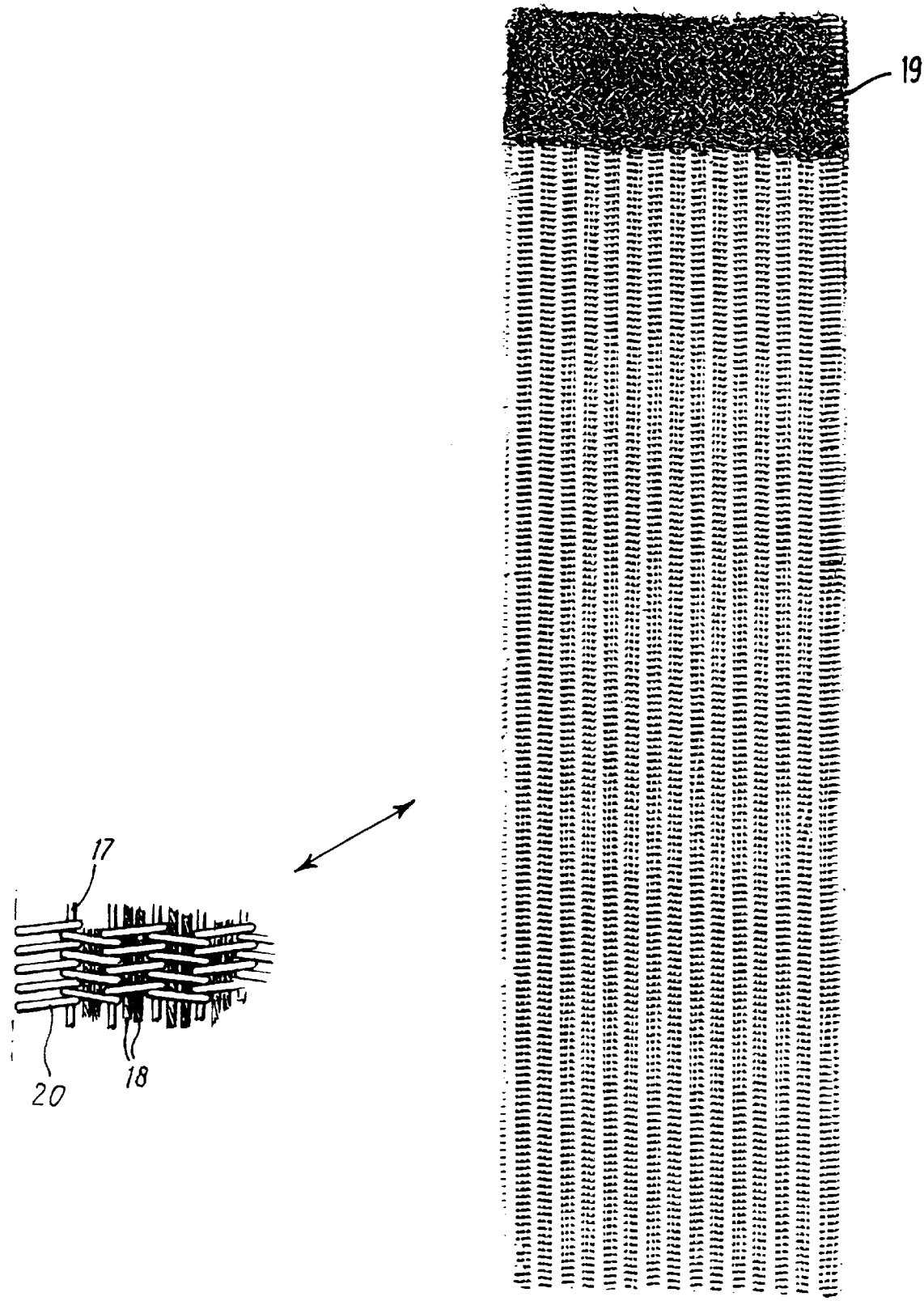
FIG. 2 is a plan view of the dewatering belt used in the process of FIG. 1.
Figure 3:
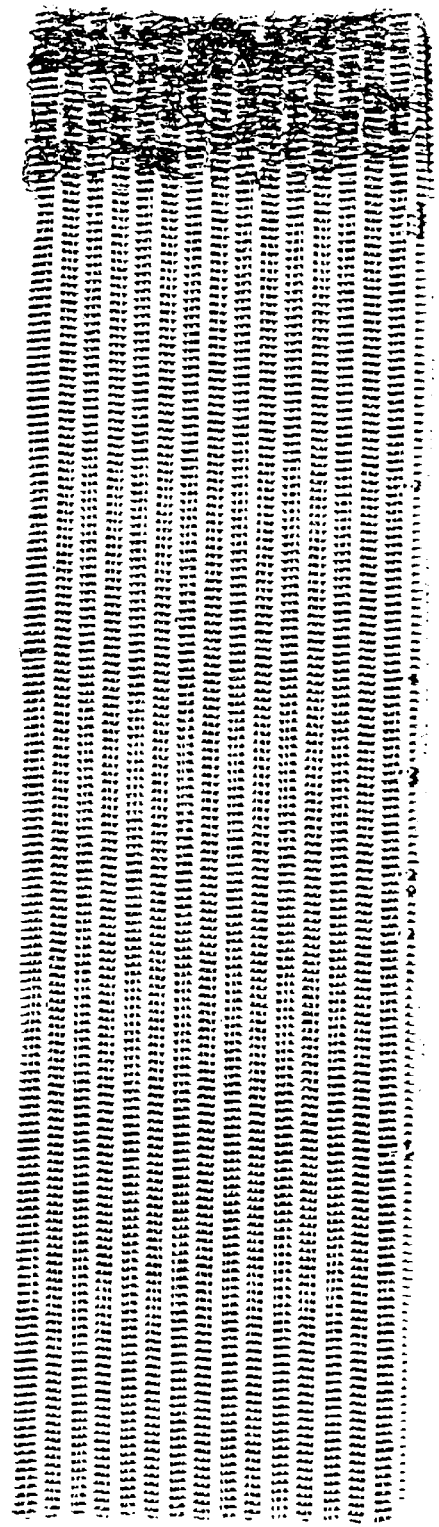
FIG. 3 is an underplan view of the belt of FIG. 2.

FIGS. 2 and 3 show one of the press belts of FIG. 1 The belt comprises a multiplicity of individual coils 20 of monofilament polyester material arranged in interdigitated side-by-side disposition, adjacent coils being connected together by respective hinge wires 17 threaded through the tunnels formed by such interdigitated coils 20. Adjacent coils 20 are of opposite hand. The hinge wires 17 are deformed into a crimped appearance and the end regions of the individual turns are deformed. The structure is set by subjecting the fabric, when under tension, to a suitable heat setting temperature for the material, thus to impart dimensional stability to the fabric.

Two conducting wires 18 are inserted in each coil intermediate the interdigitating portions of that coil with adjacent coils. Staple wire fibers 19 are then needled to the upper surface and optionally the lower surface of the belt. The belt provides the necessary conductive elements for electro-osmosis while at the same time being relatively simple to produce and easy to clean.

The use of the dewatering belt described above in lieu of a conventional belt reduces the overall dewatering cost per $m^3$ of water removed by approximately 27% and the cost per ton of dry cake obtained by approximately 46%. These cost reductions, which take into account the additional fabric production costs and additional power requirements, result from the lower dumping costs of the dewatered product and reduced belt contamination.

It is to be understood that the above described embodiment is by way of illustration only. Many modifications and variations are possible.

I claim:

1. A sludge dewatering process in which a sludge product comprising water and other materials is subjected to compressive mechanical forces and electro-osmosis using a belt comprising, at least in part, electrically conductive material, wherein the belt comprises a plurality of connected spiral yarns and wherein the said electrically conductive material is inserted into and/or onto the said spiral yarns.

2. A dewatering process as claimed in claim 1, wherein the product is simultaneously subjected to said compressive mechanical forces and electro-osmosis.

3. A dewatering process as claimed in claim 1, wherein a flocculating agent is added to the product.

4. A dewatering process as claimed in claim 1, wherein a potential difference of no greater than 30 V is applied across the belt.

5. A dewatering process as claimed in claim 1, wherein an electric current no greater than 120 A flows through the electrically conductive material of the belt.

6. A dewatering process as claimed in claim 5, wherein the electrically conductive material comprises steel, copper or carbon.

7. A dewatering process as claimed in claim 5, wherein at least some of the electrically conductive material consists of electrically conductive staple fiber secured to at least one side of a base material.

8. A dewatering process as claimed in claim 1, wherein at least some of the electrically conductive material is in the form of wires or strips extending in the cross machine direction of the belt.

9. The use of a filter belt in a sludge dewatering process in which a sludge product comprising water and other materials is subjected to compressive mechanical forces and electro-osmosis, the said belt comprising, at least in part, electrically conductive material, wherein the belt comprises a plurality of connected spiral yarns and the said electrically conductive material is inserted into and/or onto the said spiral yarns.

10. The use of a filter belt as claimed in claim 9, wherein the electrically conductive material comprises steel, copper or carbon.

11. The use of a filter belt as claimed in claim 9, wherein at least some of the electrically conductive material consists of electrically conductive staple fiber secured to at least one side of a fabric.

12. A filter belt as claimed in claim 9, wherein at least some of the electrically conductive material is in the form of wires or strips extending in the cross-machine direction of the belt.

* * * * *